United States Patent
Thiriet et al.

(10) Patent No.: US 10,054,053 B2
(45) Date of Patent: Aug. 21, 2018

(54) TURBOMACHINE DESIGNED TO OPERATE IN TURNING GEAR MODE

(71) Applicant: SAFRAN HELICOPTER ENGINES, Bordes (FR)

(72) Inventors: Romain Thiriet, Jurancon (FR); Vincent Poumarede, Tarbes (FR); Camel Serghine, Boeil-Bezing (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 308 days.

(21) Appl. No.: 15/023,216

(22) PCT Filed: Sep. 29, 2014

(86) PCT No.: PCT/FR2014/052443
§ 371 (c)(1),
(2) Date: Mar. 18, 2016

(87) PCT Pub. No.: WO2015/044613
PCT Pub. Date: Apr. 2, 2015

(65) Prior Publication Data
US 2016/0230671 A1    Aug. 11, 2016

(30) Foreign Application Priority Data
Sep. 30, 2013   (FR) .................................... 13 59439

(51) Int. Cl.
*F01D 25/18*       (2006.01)
*F02C 7/06*        (2006.01)
(Continued)

(52) U.S. Cl.
CPC ............... *F02C 7/06* (2013.01); *F01D 25/10* (2013.01); *F01D 25/18* (2013.01); *F01D 25/36* (2013.01);
(Continued)

(58) Field of Classification Search
CPC .......... F01D 25/18; F01D 25/10; F01D 25/20; F01D 19/00; F01D 21/00; F02C 7/06;
(Continued)

(56) References Cited

U.S. PATENT DOCUMENTS 2,388,523 A    11/1945  Buechel
4,354,345 A *  10/1982  Dreisbach, Jr. ........... F02C 7/14
                                                     60/39.08
(Continued)

FOREIGN PATENT DOCUMENTS

CN    101011933 A    8/2007
CN    101668960 A    3/2010
(Continued)

OTHER PUBLICATIONS

Combined Chinese Office Action and Search Report dated Jan. 25, 2017 in Chinese Patent Application No. 201480053783.8 (submitting English language translation only).
(Continued)

*Primary Examiner* — William H Rodriguez
(74) *Attorney, Agent, or Firm* — Oblon, McClelland, Maier & Neustadt, L.L.P.

(57) ABSTRACT

A field of turbine engines, and more particularly to an engine including a compressor; a combustion chamber; a first turbine connected to the compressor by a first rotary shaft; an actuator device for actuating the first rotary shaft in order to keep the first turbine and the compressor in rotation while the combustion chamber is extinguished; and a lubrication circuit for lubricating the engine. The circuit passes through at least one heat source suitable for heating the lubricant in the lubrication circuit while the first turbine and the compressor are rotating with the combustion chamber extinguished.

12 Claims, 13 Drawing Sheets

(51) Int. Cl.
    *F01D 25/10*    (2006.01)
    *F01D 25/36*    (2006.01)
    *F02C 3/04*     (2006.01)
    *F02C 7/268*    (2006.01)
    *F02C 6/18*     (2006.01)

(52) U.S. Cl.
    CPC ............... *F02C 3/04* (2013.01); *F02C 6/18* (2013.01); *F02C 7/268* (2013.01); *F05D 2220/32* (2013.01); *F05D 2220/76* (2013.01); *F05D 2240/35* (2013.01); *F05D 2260/213* (2013.01); *F05D 2260/85* (2013.01); *Y02T 50/675* (2013.01)

(58) Field of Classification Search
    CPC ...... F02C 7/268; F02C 7/26; F05D 2260/213; F05D 2260/85; F01K 13/02; F02N 11/00
    See application file for complete search history.

(56) References Cited

U.S. PATENT DOCUMENTS

| | | | | |
|---|---|---|---|---|
| 4,696,156 | A * | 9/1987 | Burr | F01D 25/18 60/39.08 |
| 8,281,563 | B2 * | 10/2012 | Pisseloup | F01D 25/20 184/6.11 |
| 8,910,463 | B2 * | 12/2014 | Telakowski | F01D 25/18 184/6.11 |
| 2006/0005547 | A1 * | 1/2006 | Brouillet | F02C 7/12 60/802 |
| 2006/0108807 | A1 | 5/2006 | Bouiller et al. | |
| 2006/0260323 | A1 | 11/2006 | Moulebhar | |
| 2007/0246302 | A1 * | 10/2007 | Bell | F01D 25/20 184/6.11 |
| 2010/0107648 | A1 | 5/2010 | Bulin et al. | |
| 2010/0300117 | A1 | 12/2010 | Moulebhar | |
| 2013/0219905 | A1 | 8/2013 | Marconi et al. | |
| 2016/0348583 | A1 * | 12/2016 | Augros | F01M 5/001 |

FOREIGN PATENT DOCUMENTS

| | | |
|---|---|---|
| CN | 101688476 A | 3/2010 |
| CN | 103314198 A | 9/2013 |
| EP | 1 662 636 A2 | 5/2006 |
| FR | 2 915 238 A1 | 10/2008 |
| GB | 1044795 A | 10/1966 |
| WO | 2012/059671 A2 | 5/2012 |

OTHER PUBLICATIONS

International Search Report dated Jan. 22, 2015, in PCT/FR2014/052443 Filed Sep. 29, 2014.

* cited by examiner

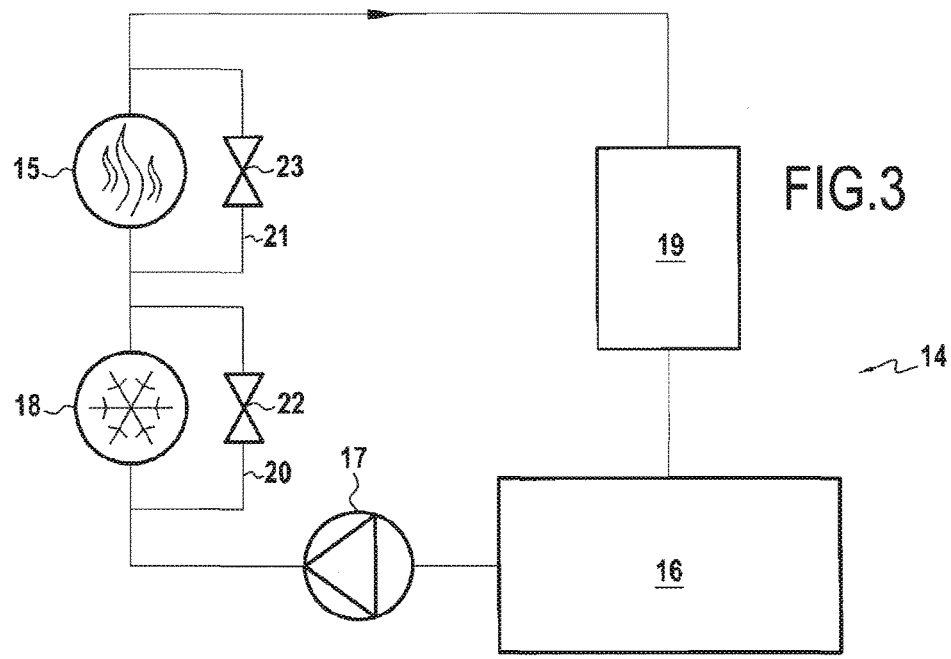
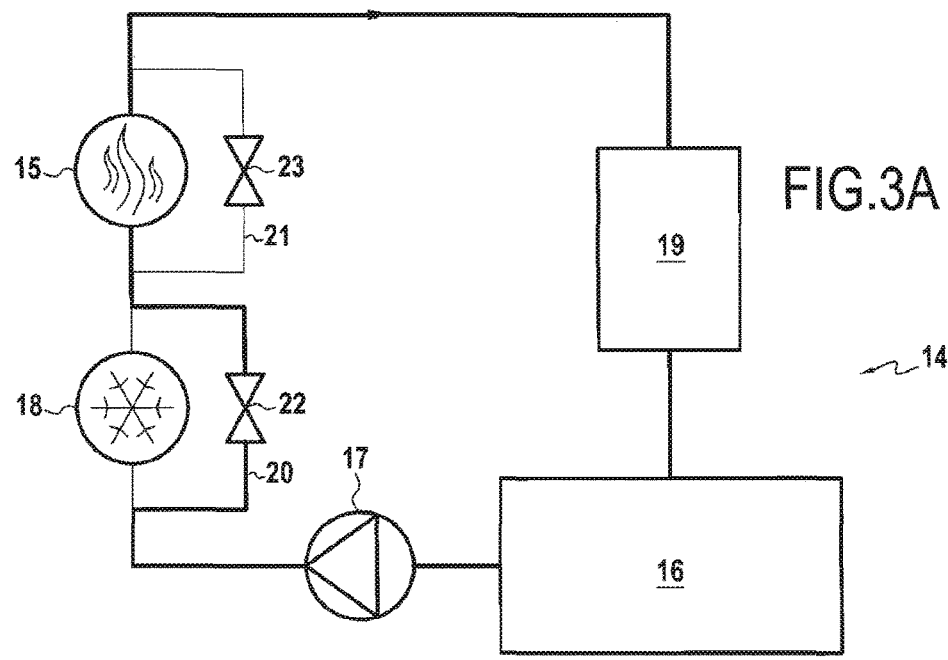

TURBOMACHINE DESIGNED TO OPERATE IN TURNING GEAR MODE

BACKGROUND OF THE INVENTION

The present invention relates to the field of turbine engines and in particular to their lubrication.

The term "turbine engine" is used in the present context to mean any machine for converting the thermal energy of a working fluid into mechanical energy by causing said working fluid to expand in a turbine. More particularly, the working fluid may be a combustion gas resulting from the chemical reaction of a fuel with air in a combustion chamber, after the air has been compressed in a compressor that is itself actuated by the turbine via a first rotary shaft. Thus, turbine engines, as understood in the present context, comprise bypass and non-bypass turbojets, turboprops, turboshaft engines, or gas turbines, among others. In the description below, the terms "upstream" and "downstream" are defined relative to the normal flow direction of the working fluid through the turbine engine.

In order to reduce fuel consumption on multi-engine power plants, proposals have been made, in particular in French patent application FR 2 967 132 A1, to extinguish the combustion chamber of one or more engines under cruising conditions, with the engines that continue to operate thus operating at higher power levels and thereby achieving better specific fuel consumption. In order to accelerate restarting, in particular for the purpose of possible emergency restarting in order to replace or back up another power source that has failed, French patent application FR 2 967 132 A1 also proposes using an actuator device for actuating said first rotary shaft to keep said turbine and compressor in rotation for the or each turbine engine in which the combustion chamber is extinguished. Nevertheless, in such a standby mode, known as "turning mode", the lubricant is no longer heated by heat losses from the engine, and depending on atmospheric conditions, in particular at high altitude or in cold weather, its temperature can drop rapidly to values that are very low, to such an extent that the engine is no longer properly lubricated. Unfortunately, one of the limitations on use that are inherent to such turbine engines lies in the need to have sufficient lubrication before it is possible to deliver power to the power takeoff shaft, which requires some minimum temperature for the lubricant, usually of about 273 kelvins (K) or 278 K, depending on the lubricant. It can thus be seen that, for an engine that is kept in turning mode with its combustion chamber extinguished, it is desirable to maintain at least some minimum temperature for the lubricant.

OBJECT AND SUMMARY OF THE INVENTION

The invention seeks to remedy those drawbacks. In particular, the present disclosure seeks to propose a turbine engine capable of being kept in turning mode even at very low temperatures, while continuing to ensure that it is lubricated with lubricant of appropriate temperature and viscosity.

In at least one embodiment, this object is achieved by the fact that in such a turbine engine comprising at least: a compressor; a combustion chamber situated downstream from the compressor for combustion of a mixture of fuel and of air coming from the compressor; a first turbine for expanding the combustion gas coming from the combustion chamber and driving the compressor via a first rotary shaft; an actuator device for actuating said first rotary shaft to keep the first turbine and the compressor in rotation while the combustion chamber is extinguished; and a lubrication circuit of the engine; the lubrication circuit is arranged in such a manner as to lubricate at least one bearing of said first rotary shaft and to pass through at least one heat source including at least one electrical load suitable for converting electrical energy at least in part into heat for heating a lubricant in said lubrication circuit when the temperature of the lubricant drops below a first predetermined threshold while the first turbine and the compressor are rotating with the combustion chamber extinguished.

By means of these provisions, the lubricant may be kept in turning mode at a temperature that is sufficient to ensure appropriate lubrication of the engine, even at very low ambient temperatures.

In particular, the heat source may comprise the device for actuating the first rotary shaft. By way of example, if this device comprises an electrical machine, such as a motor-generator mechanically coupled to the rotary shaft, its own operation can generate sufficient heat to heat the lubricant. Furthermore, if said actuator device further comprises a power converter for electrically powering said electrical machine, its operation can also generate enough heat to heat the lubricant. In any event, the discharging of this heat from the actuator device by means of the lubricant flowing through the lubrication circuit also serves to cool the actuator device, which cooling may be necessary, or at least advantageous, given the mechanical power delivered by the actuator device.

Furthermore, said heat source may include a heat exchanger for transmitting heat to the lubricant in the lubrication circuit.

Another possibility that can be envisaged for the heat source is an electrical resistor. Such an electrical resistor can easily be incorporated in the lubrication circuit, e.g. by being immersed in a lubricant tank forming part of the circuit. It can be activated and deactivated easily by means of its electrical power supply, thereby simplifying accurate temperature regulation of the lubricant.

In order to regulate the temperature of the lubricant, the lubrication circuit may also include a closable bypass duct around the heat source. In order to be closed in response to a need for heating the lubricant, this closable duct may include, for example, a thermostatic valve or a valve connected to a control unit.

In order to obtain greater thermal power and/or in order to facilitate regulating the heating of the lubricant, the lubrication circuit may pass through at least two heat sources suitable for heating the lubricant in said circuit during rotation of said turbine and compressor with the combustion chamber extinguished. These two heat sources may be arranged in parallel in order to minimize head loses in the lubrication circuit, or in series in order to facilitate temperature regulation of the circuit.

Although the turbine engine may require its lubricant to be heated while in turning mode, it can become desirable to cool the lubricant once the combustion chamber is lighted. In order to do this, the lubrication circuit may also pass through at least one heat sink for cooling the lubricant while the combustion chamber is lighted. In order to enable the lubrication circuit to be regulated also in this situation, the circuit may also include a closable duct bypassing the heat sink. Like the duct bypassing the heat source, this other bypass duct may be provided with a thermostatic valve or with a valve connected to a control unit for the purpose of closing it in response to a need to cool the lubricant.

The turbine engine may in particular be of the turboshaft engine type or of the turboprop type, in which case it may also include a second turbine arranged downstream from the first turbine and mechanically coupled to a power takeoff shaft.

The present disclosure also relates to a power plant having at least the above-mentioned first turbine engine and a second turbine engine, and also to an aircraft fitted with such a power plant. It is thus possible to keep the first turbine engine in turning mode while the second turbine engine is operating normally, and to light the combustion chamber of the first turbine engine in order to deliver power in addition to that from the second turbine engine. Naturally, the power plant may have some number of engines that is greater than two, such as for example three or even more.

Furthermore, the present invention also relates to a method of regulating the temperature of a lubricant in a lubrication circuit of a turbine engine comprising at least: a compressor; a combustion chamber situated downstream from the compressor for combustion of a mixture of fuel and of air coming from the compressor; a first turbine for expanding combustion gas coming from the combustion chamber and driving the compressor via a first rotary shaft; and an actuator device for actuating said first rotary shaft; wherein said lubricant for lubricating at least one bearing of said first rotary shaft is directed through a heat source through which said lubrication circuit passes and comprising at least one electrical load for converting electrical energy at least in part into heat for heating the lubricant when the temperature of the lubricant drops below a first predetermined threshold while the first turbine and the compressor are being kept in rotation by said actuator device with the combustion chamber extinguished. In addition, said lubricant may be directed through a heat sink through which said circuit passes in order to be cooled when the temperature of the lubricant exceeds a second predetermined threshold while the combustion chamber is lighted.

BRIEF DESCRIPTION OF THE DRAWINGS

The invention can be well understood and its advantages appear better on reading the following detailed description of embodiments given as non-limiting examples. The description refers to the accompanying drawings, in which:

FIG. 3 is a diagram of the lubrication circuit in a first embodiment for one of the engines of the FIG. 2 power plant;

FIG. 3A shows the flow of lubricant through the FIG. 3 lubrication circuit below a first temperature threshold;

DETAILED DESCRIPTION OF THE INVENTION

Figure 1:
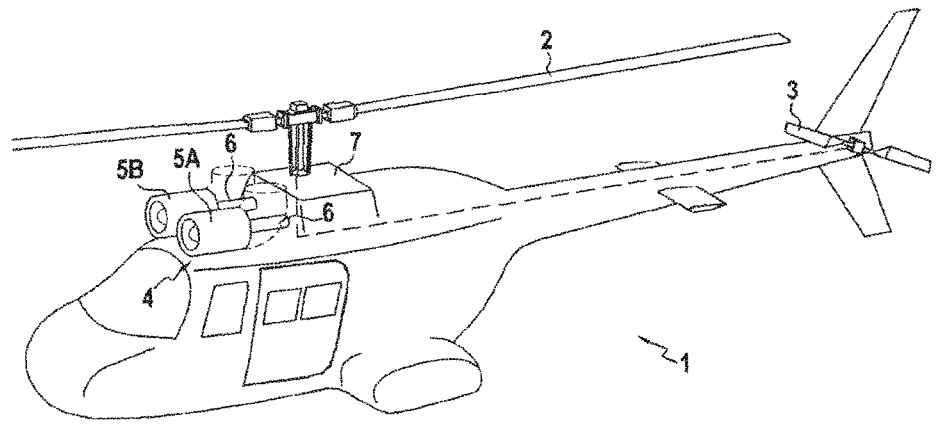
FIG. 1 is a diagram of an aircraft with a power plant comprising two turbine engines.

The first figure shows a rotary wing aircraft 1, more specifically a helicopter having a main rotor 2 and an anti-torque tail rotor 3, which rotors are coupled to a power plant 4 that actuates them. The power plant 4 shown comprises a first turbine engine 5a and a second turbine engine 5b. More specifically, these engines 5a and 5b are turboshaft engines having both of their power takeoff shafts 6 connected to a main gearbox 7 for actuating the main rotor 2 and the tail rotor 3.

Figure 2:
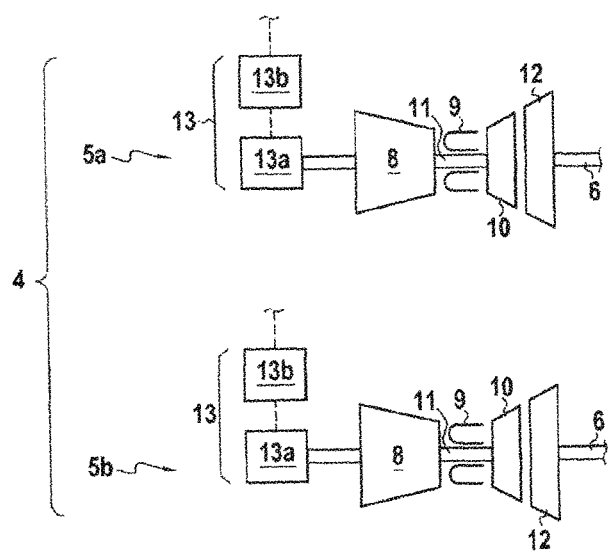
FIG. 2 shows the power plant in greater detail.

The power plant 4 is shown in greater detail in FIG. 2. Each engine 5a, 5b comprises a compressor 8, a combustion chamber 9, a first turbine 10 connected by a rotary shaft 11 to the compressor 8, and a second turbine 12, or "free" turbine, that is coupled to the power takeoff shaft 6. The assembly comprising the compressor 8, the combustion chamber 9, the first gas turbine 10, and the rotary shaft 11 is also known as a "gas generator". The rotary shaft 11 of each gas generator is coupled mechanically to an actuator device 13 comprising an electrical machine 13a, more specifically a motor-generator, and a power converter 13b that is electrically connected to the electrical machine 13a and that is connected to the electricity network of the aircraft 1.

The actuator device 13 serves both for starting the corresponding engine 5a, 5b and also for generating electricity after it has started. During starting, the electrical machine 13a acts in motor mode, and the power converter 13b powers it electrically from the electricity network of the aircraft. After starting, the electrical machine 13a operates in generator mode and the power converter adapts the electricity it generates to an appropriate voltage and amperage for powering the electricity network of the aircraft.

Furthermore, the actuator device 13 can nevertheless also be used to keep the corresponding engine 5a, 5b in turning mode, by causing the rotary shaft 11 to turn while the combustion chamber 9 is extinguished, at a reduced speed $N_{turn}$, which may for example lie in the range 5% to 20% of a nominal speed $N_1$ of the rotary shaft 11. Keeping an engine in turning mode serves to accelerate possible starting thereof.

The power delivered by the power plant 4 may vary significantly depending on the stage of flight of the aircraft 1. Thus, the power required under cruising conditions is normally substantially less than the maximum continuous power that the power plant 4 can deliver, and even less than its maximum takeoff power. Given that the power plant 4 is dimensioned as a function of its maximum takeoff power, it is significantly overdimensioned compared with the power required for cruising conditions. Consequently, while cruising, with both engines 5a and 5b in operation, they may both be far away from their optimum operating speed, which leads to relatively high specific fuel consumption. In practice, with a power plant that has a plurality of engines, it is possible to envisage maintaining cruising conditions with at least one of the engines extinguished. The other engines can then operate at a speed that is closer to their optimum speed, so specific fuel consumption can be reduced. In order to enable a power plant to operate in such a mode of operation, while also ensuring that the engine that is extinguished can be started immediately, proposals are made in FR 2 967 132 to keep this engine that is extinguished in a turning mode.

In the power plant 4 shown in FIG. 2, the first engine 5a is thus extinguished while the aircraft 1 is cruising, and the second engine 5b delivers all of the power for the main rotor 2 and the tail rotor 3 via the main gearbox 7. The electrical machine 13a of the second engine 5b also acts simultaneously to power the electricity network of the aircraft 1 via its power converter 13b. In order to be able to ensure that the first engine 5a can be started in an emergency, in particular in the event of the second engine 5b failing, the first engine 5a is kept in turning mode by its electrical machine 13a driving its rotary shaft 11 under power from its power converter 13b.

Nevertheless, in flight, with the combustion chamber 9 extinguished and with ambient temperatures that may be very low, particularly at high altitude, the temperature T of the lubricant in the first engine 5a may drop very significantly. In order to prevent it reaching a level that is too low, which might compromise lubrication of the moving parts of the first engine 5a, the lubrication circuit 14 in a first embodiment as shown in FIG. 3 passes through a heat source 15.

More specifically, the lubrication circuit 14 is a closed circuit comprising a tank 16 and a pump 17 and passing through a heat sink 18 and the heat source 15, together with the elements 19 for lubricating in the first engine 5a. The circuit 14 also has bypass ducts 20 and 21 respectively for bypassing the heat sink 18 and the heat source 15, each having a respective thermostatic valve 22, 23 for closing it in a corresponding predetermined temperature range. Nevertheless, valves that are connected to a control unit, which is itself connected to sensors for sensing the temperature of the lubricant, could be used instead of thermostatic valves for the same purpose.

The heat sink 18 is typically a lubricant/air heat exchanger serving to discharge heat from the lubricant to ambient air. Nevertheless, other types of heat sink, in particular lubricant/fuel heat exchangers, could also be used.

Figure 4A:
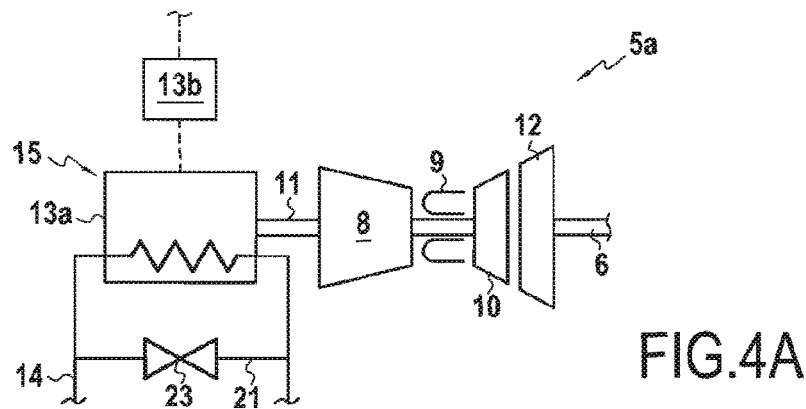
FIGS. 4A to 4E show a heat source arranged in the FIG. 3 lubrication circuit in various different alternatives.
Figure 4B:
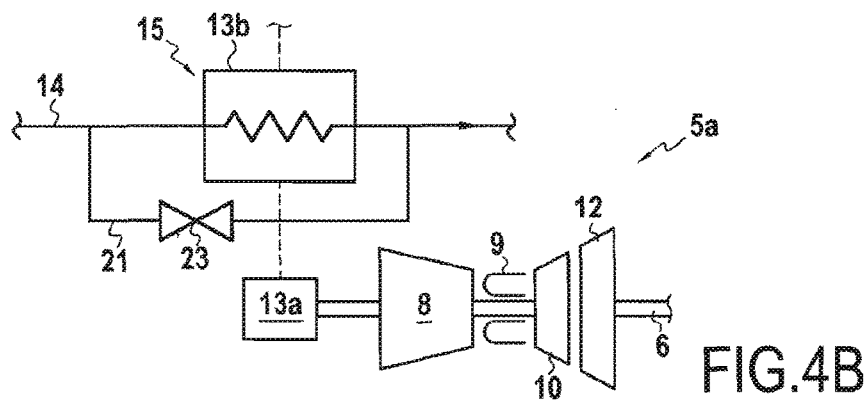
Figure 4C:
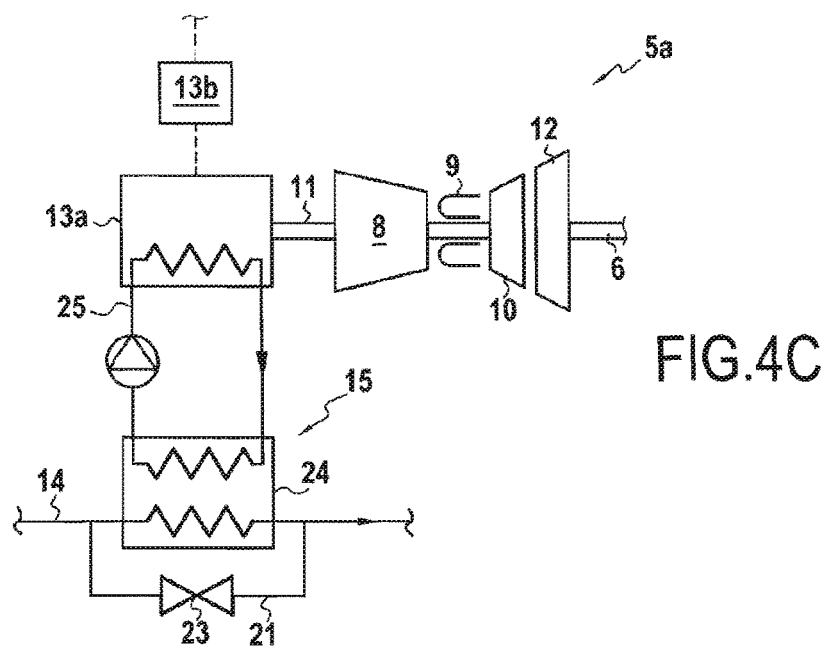
Figure 4D:
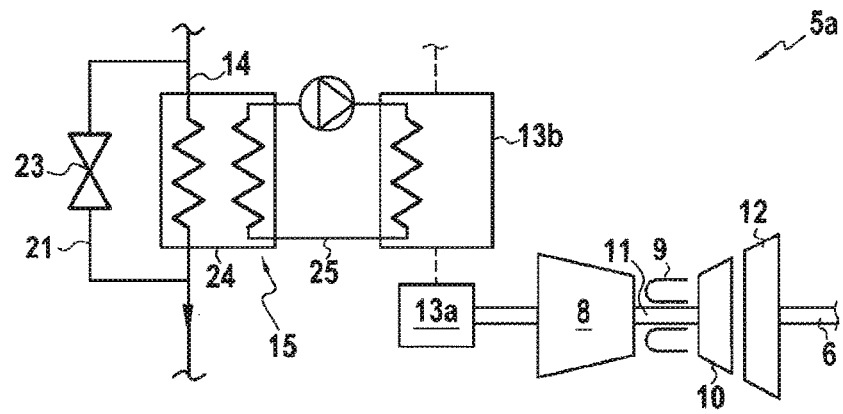

By way of example, the heat source 15 may comprise the electrical machine 13a of the first engine 5a or its power converter 13b. In the variant shown in FIG. 4A, the heat source 15 is the electrical machine 13a through which the lubrication circuit 14 passes directly. When operating as a motor driving the rotary shaft 11 in turning mode, this electrical machine 13a generates heat, which heat is discharged in this variant by the lubricant flowing through the lubrication circuit 14. Thus, the heating of the lubricant can contribute simultaneously to cooling the electrical machine. In the variant shown in FIG. 4B, the heat source 15 is the power converter 13b. While the electrical machine 13a is operating as a motor driving the rotary shaft 11 in turning mode, the powering of this electrical machine via the power converter 13b also generates heat, which heat is discharged in this variant by the lubricant flowing through the lubrication circuit 14. Thus, the heating of the lubricant may contribute simultaneously to cooling the power converter 13b. The transfer of heat between the device 13 for actuating the rotary shaft 11 and the lubrication circuit 14 need not take place directly, as in the first two variants, but indirectly, via a cooling circuit passing through a heat exchanger that also has the lubrication circuit 14 passing separately therethrough. Thus, in a third variant, shown in FIG. 4C, the heat source 15 of the lubrication circuit 14 comprises a heat exchanger 24 connected in this way to a circuit 25 for cooling the electrical machine 13a of the first engine 5a. In a fourth variant, shown in FIG. 4D, the heat source comprises a heat exchanger 24 connected in the same manner to the circuit 25 for cooling the power converter 13b of the first engine 5a.

Figure 4E:
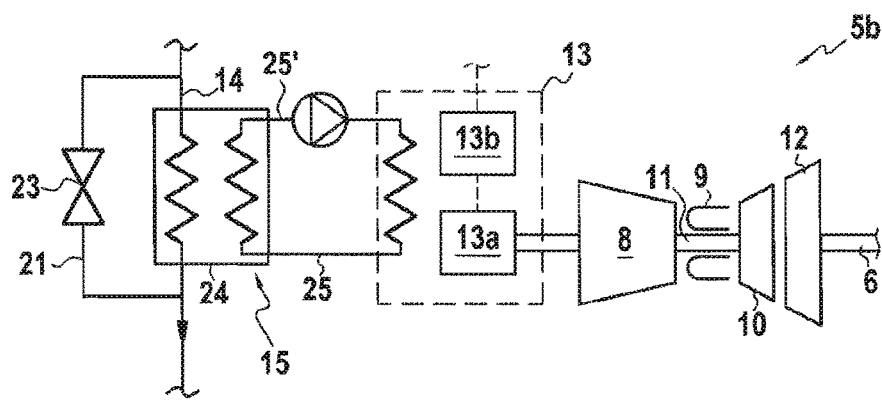

In particular when the heat source 15 of the lubrication circuit 14 includes such a heat exchanger, it is also possible to envisage using it to transfer heat from members other than the device 13 for driving the first engine 5a. By way of example, this transfer of heat may take place from the second engine 5b which remains in operation in flight while the first engine 5a is in turning mode. Thus, in a fifth variant, shown in FIG. 4E, the heat exchanger 24 forming the heat source 15 of the lubrication circuit 14 is connected to a circuit 25 for cooling the device 13 for actuating the second engine 5b. If this second engine 5b is operating normally while the first engine 5a is kept in turning mode, then the electrical machine 12a can act as an electricity generator powering the electricity network of the aircraft 1 via the power converter 13b. In this situation, both this electrical machine 13a and the power converter 13b are simultaneously generating heat that can be discharged to the lubrication circuit 14 of the first engine 5a via the cooling circuit 25'.

Figure 3B:
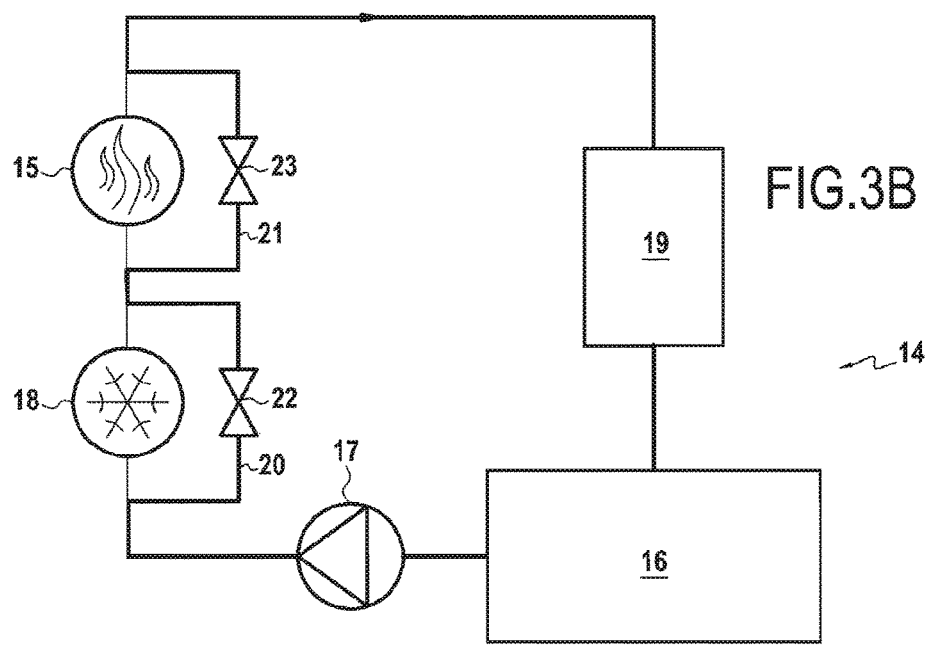
FIG. 3B shows the flow of lubricant through the FIG. 3 lubrication circuit between the first temperature threshold and a second temperature threshold.
Figure 5:
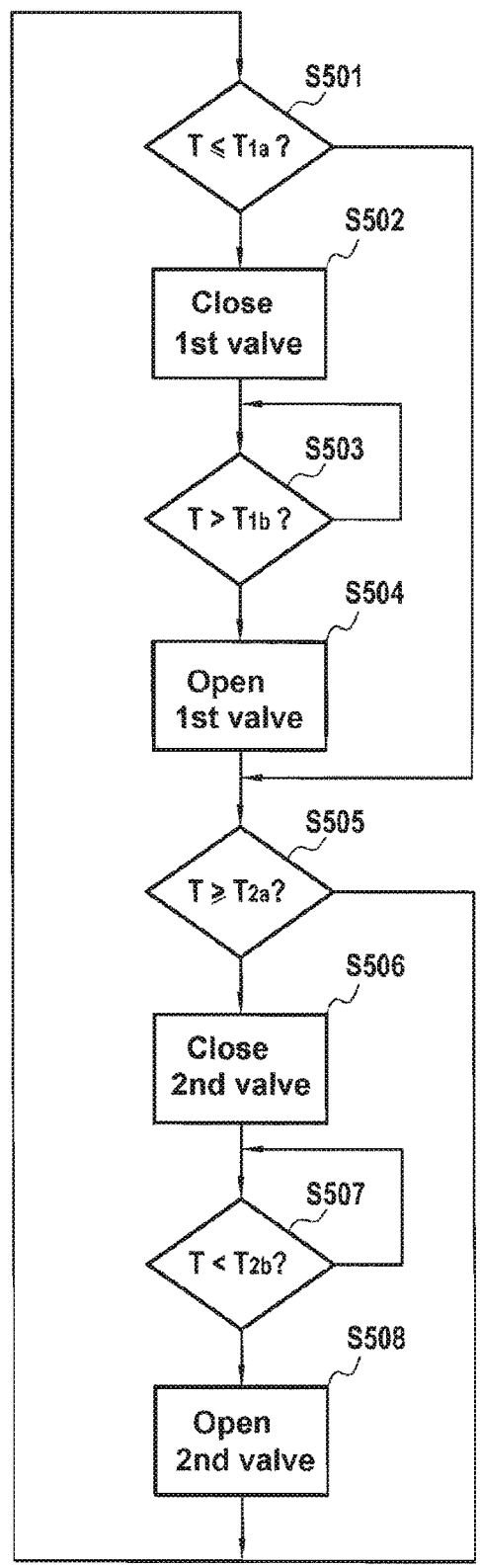
FIG. 5 is a flow chart showing diagrammatically a method of regulating the FIG. 3 lubrication circuit.

In each of these variants, the heat source 15 and the heat sink 18 can be bypassed in order to regulate the temperature of the lubricant of the first engine 5a. The flow chart of FIG. 5 shows how this temperature regulation operates, starting from an initial situation in which both thermostatic valves 22 and 23 of the lubrication circuit 14 shown in FIG. 3 are open, a situation that is shown in FIG. 3B and in which the major portion of the flow of lubricant pumped by the pump 17 through the circuit 14 bypasses both the heat sink 18 and the heat source 15, by passing respectively along the bypass ducts 20 and 21. In the step S501, the temperature T of the lubricant is compared with a first closure threshold $T_{1a}$. If the temperature T of the lubricant is equal to or less than the closure threshold $T_{1a}$, the thermostatic valve 23 in the bypass duct 21 around the heat source 15 closes in step S502, thereby closing this bypass duct 21 and forcing the lubricant to pass through the heat source 15, as shown in FIG. 3A. The lubricant is thus heated in order to ensure that it can flow, even if the first engine 5a is in turning mode. By way of example, the closure threshold $T_{1a}$ may lie in the range 333 K to 343 K.

Figure 6:
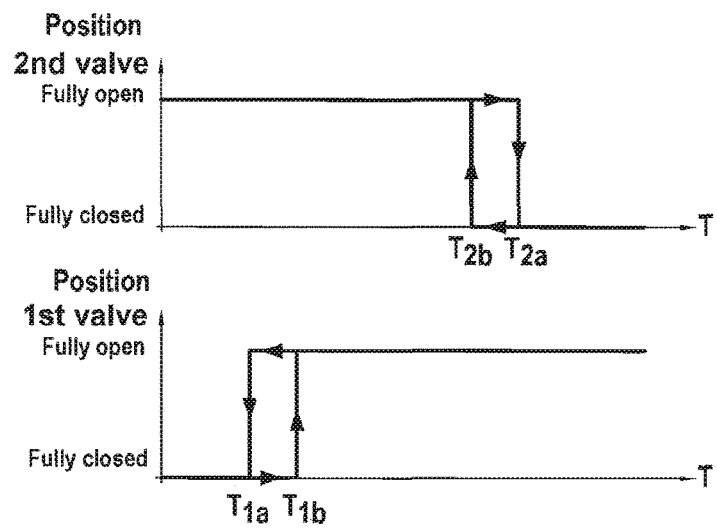
FIG. 6 is a graph showing the opening and closing of bypass valves in the FIG. 5 method.

If the thermostatic valve 23 is thus closed, in the following step S503, the temperature T of the lubricant is compared with a first opening threshold $T_{1b}$. So long as the temperature T is not higher than the opening threshold $T_{1b}$, this step is repeated regularly in a loop. If the temperature T of the lubricant is higher than this opening threshold $T_{1b}$, then the thermostatic valve 23 in the bypass duct 21 around the heat source 15 reopens in step S504 so as to return to the configuration shown in FIG. 3A. The opening threshold $T_{1b}$ may be identical to the closure threshold $T_{1a}$. Nevertheless, in order to establish hysteresis for avoiding instability of the thermostatic valve 23, the opening threshold $T_{1b}$ may be perceptibly higher than the closure threshold $T_{1a}$, e.g. 5 K to 10 K higher. This hysteresis is shown in FIG. 6. It is specific to certain types of thermostatic valve, such as wax core thermostatic valves, but other types of valve, such as solenoid valves, can also be adapted to operate with such hysteresis in order to avoid instability.

Figure 3C:
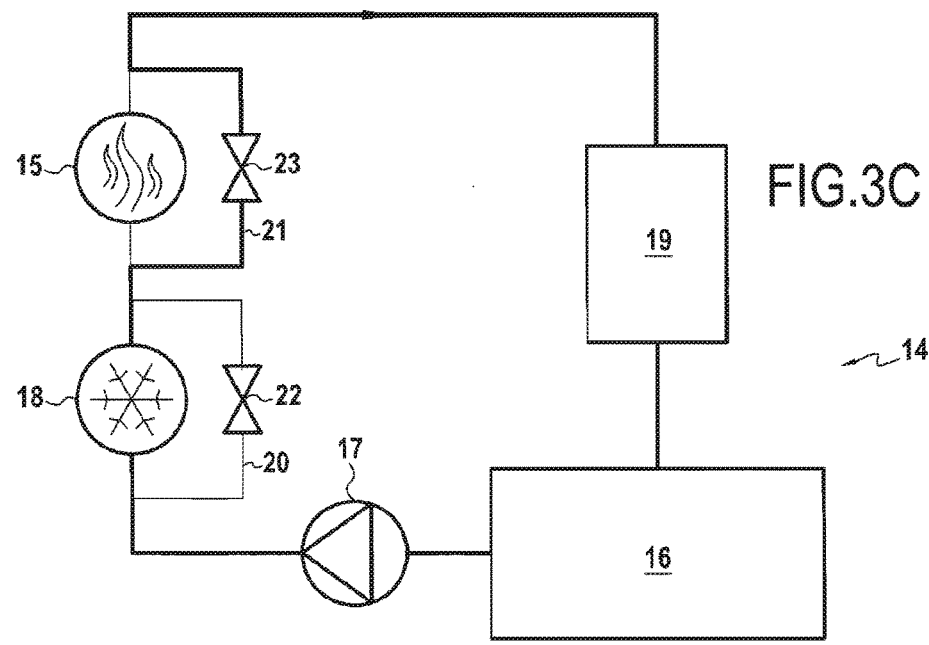
FIG. 3C shows the flow of lubricant through the FIG. 3 lubrication circuit above the second temperature threshold.

After the thermostatic valve 23 has reopened in step S504, or if the temperature T was already higher than the first closure threshold $T_{1a}$ in step S501, then in step S505, the temperature T of the lubricant is compared with a second closure threshold $T_{2a}$. If the temperature T of the lubricant is equal to or higher than this second closure threshold $T_{2a}$, the thermostatic valve 22 in the bypass duct 20 around the heat sink 18 closes in step S506, thereby closing this bypass duct 20 and forcing the lubricant to pass through the heat sink 18, as shown in FIG. 3C. The lubricant is thus cooled in order to discharge the heat generated in the first engine 5a. The second closure threshold $T_{2a}$ is substantially higher than the first closure threshold $T_{1a}$ and also than the first opening threshold $T_{1b}$, and by way of example it may lie in the range 353 K to 363 K.

If the thermostatic valve 22 is thus closed, then in the following step S507 the temperature T of the lubricant is compared with a second opening threshold $T_{2b}$. So long as the temperature T is not less than this opening threshold $T_{1b}$, this step is repeated regularly in a loop. If the temperature T of the lubricant is less than this opening threshold $T_{2b}$, the thermostatic valve 22 in the bypass duct 20 around the heat sink 18 reopens in step S508, in order to return to the configuration shown in FIG. 3B. The opening threshold $T_{2b}$ may be identical to the closure threshold $T_{2a}$. Nevertheless, in order to establish hysteresis for avoiding instability of the thermostatic valve 22, the opening threshold $T_{2b}$ may be perceptibly lower than the closure threshold $T_{2a}$, e.g. 5 K to 10 K lower, while remaining substantially higher than the first closure threshold $T_{1a}$, and than the first opening threshold $T_{1b}$. This hysteresis is also shown in FIG. 6.

Figure 7:
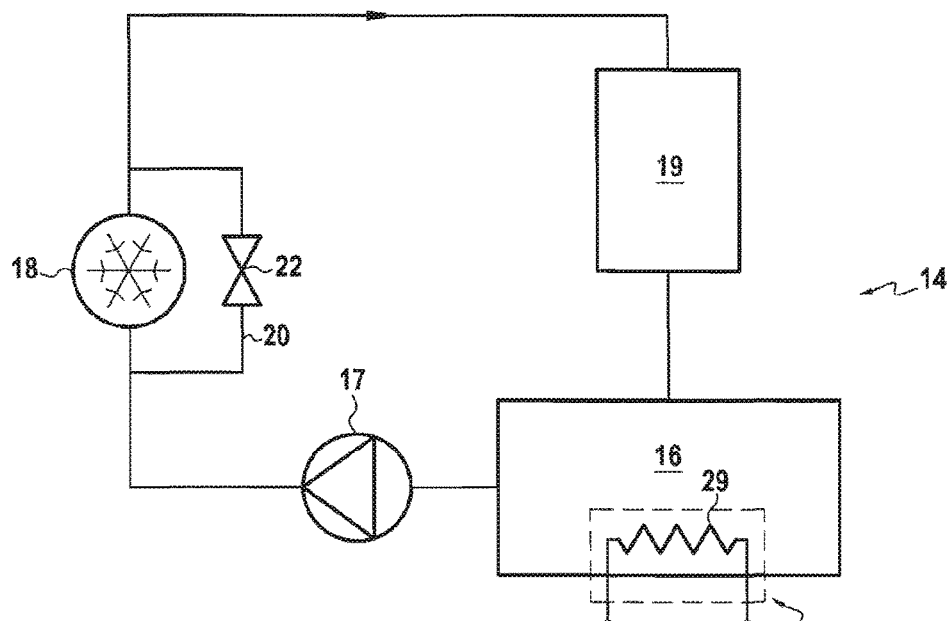
FIG. 7 is a diagram of the lubrication circuit in a second embodiment, for one of the engines of the FIG. 2 power plant.

Nevertheless, other alternatives can be envisaged for regulating the temperature of the lubricant of an engine, and in particular for heating it in turning mode. Thus, in the embodiment shown in FIG. 7, which is also applicable to the power plant 4 of FIGS. 1 and 2, the heat source 15 of the lubrication circuit 14 comprises an electrical resistor 29 in the tank 16. The other elements in this second embodiment are analogous to those with the same reference numbers in FIG. 3.

Figure 8:
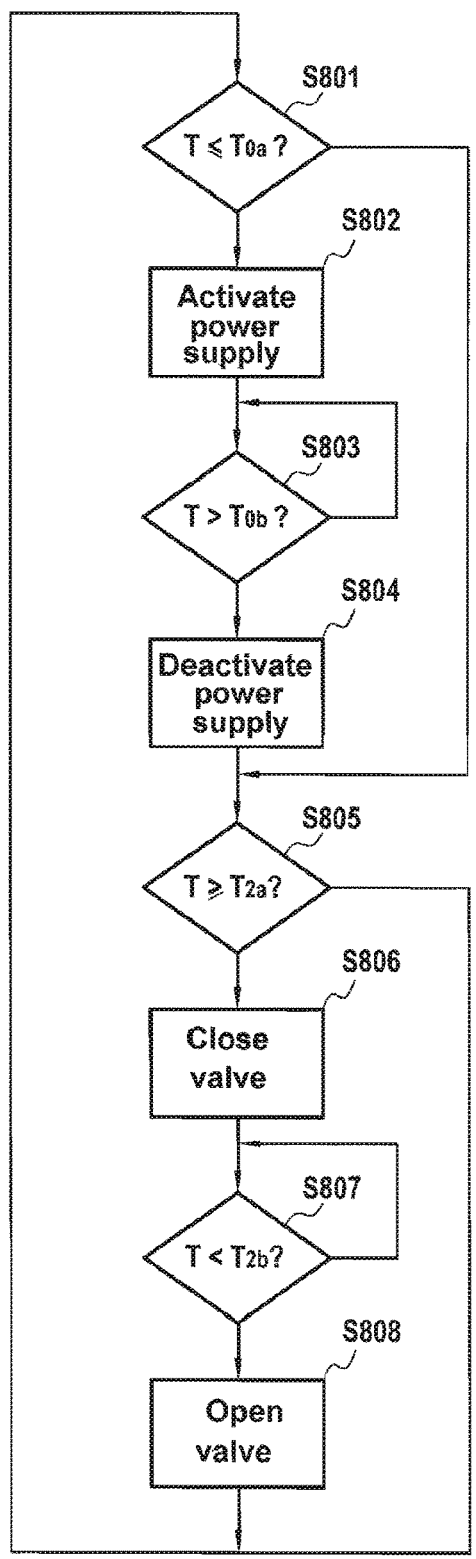
FIG. 8 is a flow chart showing diagrammatically a method of regulating the FIG. 7 lubrication circuit.

The electrical resistor 29 is connected to the electricity network of the aircraft 1 in order to be powered electrically, and it can be activated and deactivated at will. A bypass duct around the heat source 15 is therefore unnecessary for regulating the temperature T of the lubricant in the lubrication circuit 14. The flow chart of FIG. 8 shows the method of regulating this second embodiment starting from an initial situation in which the power supply to the electrical resistor 26 is deactivated and the thermostatic valve 22 is open. In step S801, the temperature T of the lubricant is compared with an activation threshold $T_{0a}$. If the temperature T of the lubricant is equal to or lower than the activation threshold $T_{0a}$, the power supply to the electrical resistor 29 is activated in step S802, thereby generating heat that is transmitted to the lubricant passing through the lubrication circuit 14. The lubricant is thus heated so as to ensure that it can flow, and this applies even if the first engine 5a is in turning mode. In this embodiment, the activation threshold $T_{0a}$ may for example lie in the range 283 K to 293 K.

Figure 9:
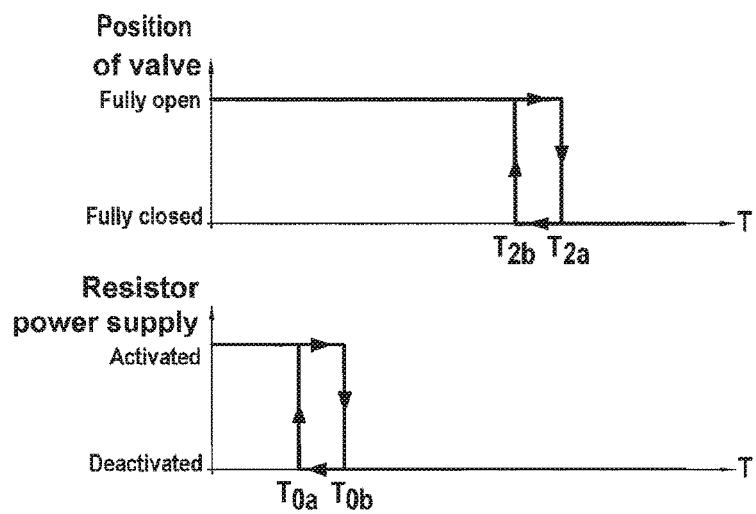
FIG. 9 is a graph showing the activation and the deactivation of an electrical power supply and the opening and the closing of bypass valves in the method of FIG. 8.

If the power supply to the electrical resistor 26 is thus activated, then in the following step S803, the temperature T of the lubricant is compared with a deactivation threshold $T_{0b}$. So long as the temperature T is not higher than this deactivation threshold $T_{0b}$, this step is repeated regularly in a loop. If the temperature T of the lubricant is higher than this deactivation threshold $T_{0b}$, the power supply to the electrical resistor 26 can be deactivated in step S804. The deactivation threshold $T_{0b}$ may be identical to the activation threshold $T_{0a}$. Nevertheless, in order to establish hysteresis, the deactivation threshold $T_{0b}$ may be perceptibly higher than the activation threshold $T_{0a}$, e.g. 5 K to 10 K higher. This hysteresis is shown in FIG. 9.

After deactivating the power supply to the electrical resistor 29 in step S804, or if the temperature T is already higher than the activation threshold $T_{0a}$ in step S801, then in step S805 the temperature T of the lubricant is compared with a closure threshold $T_{2a}$. If the temperature T of the lubricant is equal to or higher than this closure threshold $T_{2a}$, the thermostatic valve 22 in the bypass duct 20 around the heat sink 18 closes in step S806, thereby closing the bypass duct 20 and forcing the lubricant to pass through the heat sink 18. The lubricant is thus cooled in order to discharge the heat generated in the first engine 5a. This closure threshold $T_{2a}$ is substantially higher than the activation threshold $T_{0a}$ and the deactivation threshold $T_{0b}$, and by way of example it may lie in the range 353 K to 363 K.

If the thermostatic valve 22 is thus closed, then in the following step S807 the temperature T of the lubricant is compared with an opening threshold $T_{2b}$. So long as the temperature T is not lower than this opening threshold $T_{1b}$ this step is repeated regularly in a loop. If the temperature T of the lubricant is lower than this opening threshold $T_{2b}$, the thermostatic valve 22 in the bypass duct 20 around the heat sink 18 reopens in step S808. The opening threshold $T_{2}b$ may be identical to the closure threshold $T_{2a}$. Nevertheless, in order to establish hysteresis for avoiding instability of the thermostatic valve 22, the opening threshold $T_{2}b$ may be perceptibly lower than the closure threshold $T_{2a}$, e.g. 5 K to 10 K lower, while remaining substantially higher than the activation threshold $T_{0a}$ and the deactivation threshold $T_{0b}$. This hysteresis is also shown in FIG. 9.

Figure 10:
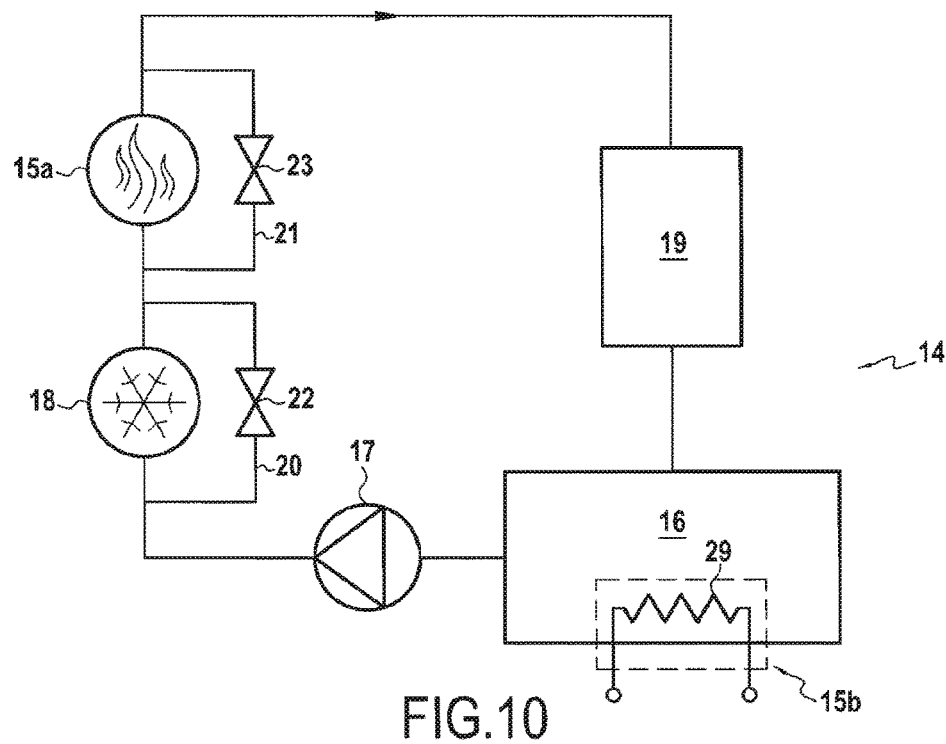
FIG. 10 is a diagram of the lubrication circuit in a third embodiment for one of the engines of the FIG. 2 power plant.

It is also possible to combine the characteristics of the first and second embodiments in a third embodiment as shown in FIG. 10. In this third embodiment, the lubrication circuit 14 has two heat sources 15a, 15b: a first heat source 15a in accordance with any of the variants shown in FIGS. 4A to 4E having a bypass duct 21 fitted with a thermostatic valve 23 as in the first embodiment; and also a second heat source 15b comprising an electrical resistor 29 in the tank 16, as in the second embodiment. The remaining elements in this third embodiment are analogous to those having the same reference numbers in FIGS. 3 and 6.

Figure 11:
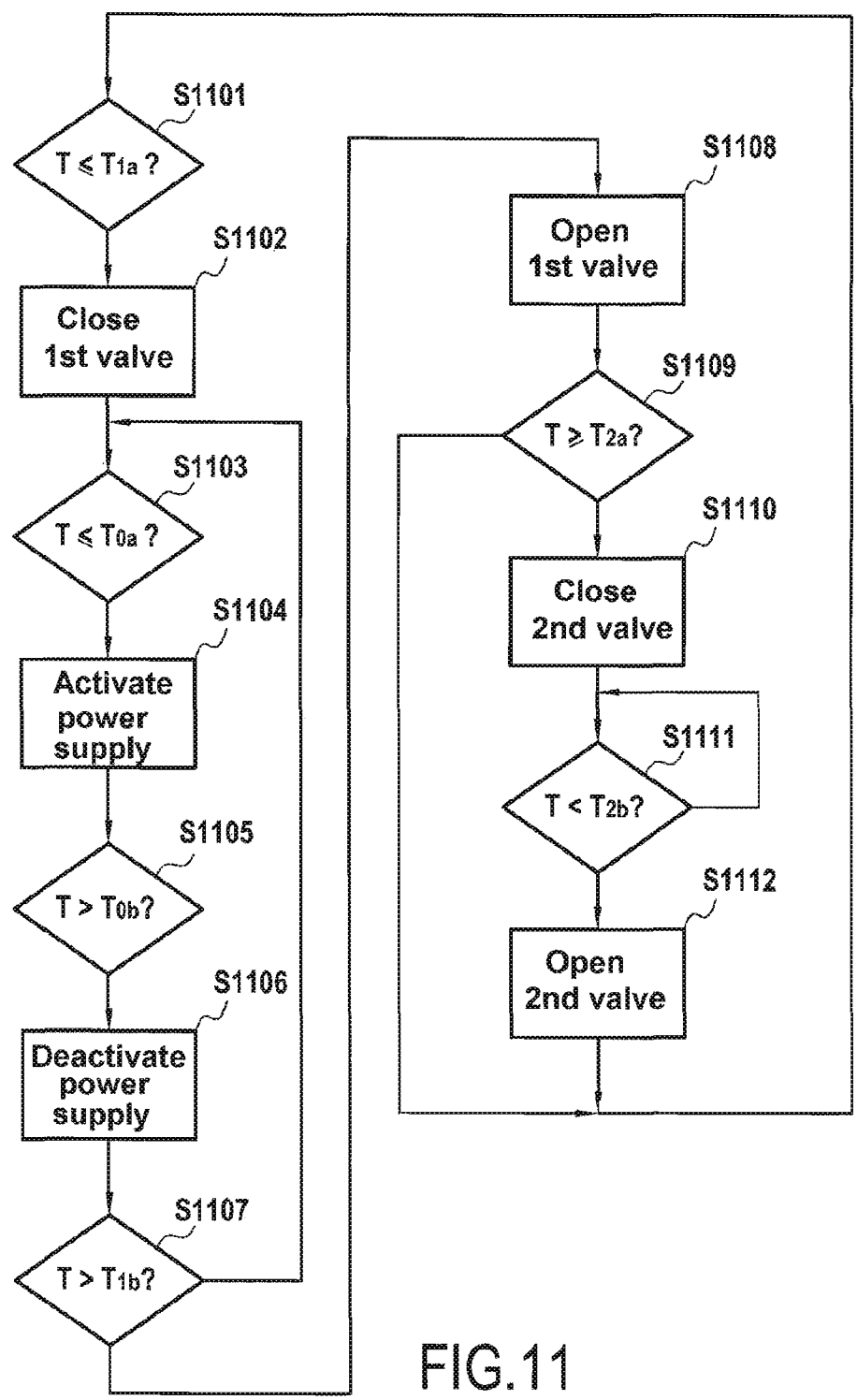
FIG. 11 is a flow chart showing diagrammatically a method of regulating the FIG. 8 lubrication circuit.

The flow chart of FIG. 11 shows the method of regulating this third embodiment starting from an initial situation in which the power supply to the electrical resistor 29 is deactivated and the thermostatic valves 22 and 23 are open. In step S1101, the temperature T of the lubricant is compared with a first closure threshold $T_{1a}$. If the temperature T of the lubricant is equal to or lower than the closure threshold $T_{1a}$, the thermostatic valve 23 in the bypass duct 21 around the first heat source 15a closes in step S1102, thereby closing this bypass duct 21 and forcing the lubricant to pass through the first heat source 15a, as shown in FIG. 3A. The lubricant is thus heated to ensure that it can flow, even if the first engine 5a is in turning mode. By way of example, the first closure threshold $T_{1a}$ may lie in the range 333 K to 343 K.

Nevertheless, it can happen that the temperature T of the lubricant is too low to enable the lubricant to be heated sufficiently quickly solely by the first heat source 15a. Consequently, in the following step S1103, the temperature T of the lubricant is compared with an activation threshold $T_{0a}$ that is substantially lower than the first closure threshold 15a. If the temperature T of the lubricant is equal to or lower than the activation threshold $T_{0a}$, the power supply to the electrical resistor 29 is activated in step S1104, thereby generating heat that is transmitted to the lubricant passing through the lubrication circuit 14. This procures additional heating of the lubricant. By way of example, in this embodiment, the activation threshold $T_{0a}$ may lie in the range 283 K to 293 K.

Figure 12:
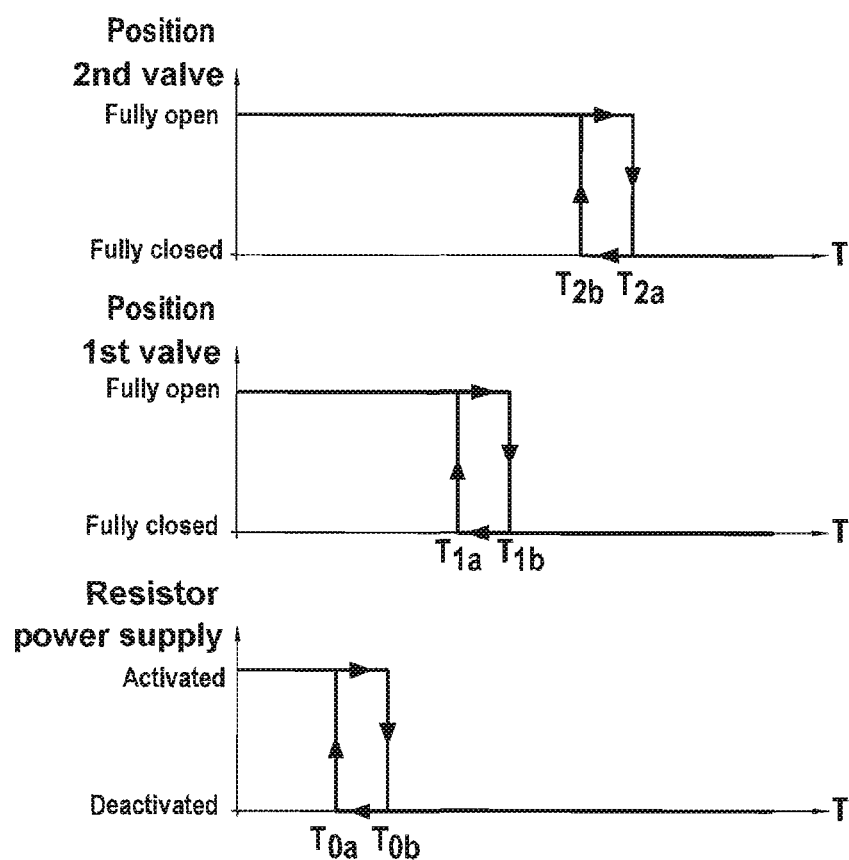
FIG. 12 is a graph showing the opening and the closing of bypass valves in the method of FIG. 11.

If the power supply to the electrical resistor 29 is thus activated, then in the following step S1105, the temperature T of the lubricant is compared with a deactivation threshold $T_{0b}$. So long as the temperature T is not higher than the deactivation threshold $T_{0b}$, this step is repeated regularly in a loop. If the temperature T of the lubricant is higher than the deactivation threshold $T_{0b}$, then the power supply to the electrical resistor 29 is deactivated in a step S1106. The deactivation threshold $T_{0b}$ may be identical to the activation threshold $T_{0a}$. Nevertheless, in order to establish hysteresis, the deactivation threshold $T_{0b}$ may be perceptibly higher than the activation threshold $T_{0a}$, e.g. 5 K to 10 K higher, while remaining substantially lower than the first closure threshold $T_{1a}$. This hysteresis is shown in FIG. 12.

After deactivation of the power supply to the electrical resistor 26 in step S1106, or if the temperature T is already higher than the activation threshold $T_{0a}$ in step S1103, then in step S1107, the temperature T of the lubricant is compared with a first opening threshold $T_{1b}$. So long as the temperature T is not higher than this opening threshold $T_{1b}$, the method is returned to step S1103, and at least the steps S1103 and S1107 are repeated in a loop. If the temperature T of the lubricant is higher than the first opening threshold $T_{1b}$, the thermostatic valve 23 in the bypass duct 21 of the heat source 15 reopens in step S1108. The first opening threshold $T_{1b}$ may be identical to the first closure threshold $T_{1a}$. Nevertheless, in order to establish hysteresis for avoiding instability of the thermostatic valve 23, the first opening threshold $T_{1b}$ may be perceptibly higher than the first closure threshold $T_{1a}$, e.g. 5 K to 10 K higher. This hysteresis is also shown in FIG. 12.

After reopening of the thermostatic valve 23 in step S1108, or if the temperature T is already higher than the first closure threshold $T_{1a}$ in step S1101, then in step S1109 the temperature T of the lubricant is compared with a second closure threshold $T_{2a}$. If the temperature T of the lubricant is equal to or higher than the second closure threshold $T_{2a}$, then the thermostatic valve 22 in the bypass duct 20 around the heat sink 18 closes in a step S1110, thereby closing the bypass duct 20 and forcing the lubricant to pass through the heat sink 18. The lubricant is thus cooled in order to discharge the heat generated in the first engine 5a. The second closure threshold $T_2a$ is substantially higher than the first closure threshold $T_{1a}$ and than the first opening threshold $T_{1b}$, and for example it may lie in the range 353 K to 363 K.

If the thermostatic valve 22 is thus closed, then in the following step S1111 the temperature T of the lubricant is compared with a second opening threshold $T_{2b}$. So long as the temperature T is not lower than this opening threshold $T_{1b}$ this step is repeated regularly in a loop. If the temperature T of the lubricant is lower than this opening threshold $T_{2b}$, the thermostatic valve 22 in the bypass duct 20 around the heat sink 18 reopens in a step S1112. The opening threshold $T_{2b}$ may be identical to the closure threshold $T_{2a}$. Nevertheless, in order to establish hysteresis for instability in the thermostatic valve 22, the opening threshold $T_{2b}$ may be perceptibly lower than the closure threshold $T_{2a}$, e.g. 5 K to 10 K lower, while remaining substantially higher than the first closure threshold $T_{1a}$ and than the first opening threshold $T_{1b}$. This hysteresis is also shown in FIG. 12.

Figure 13:
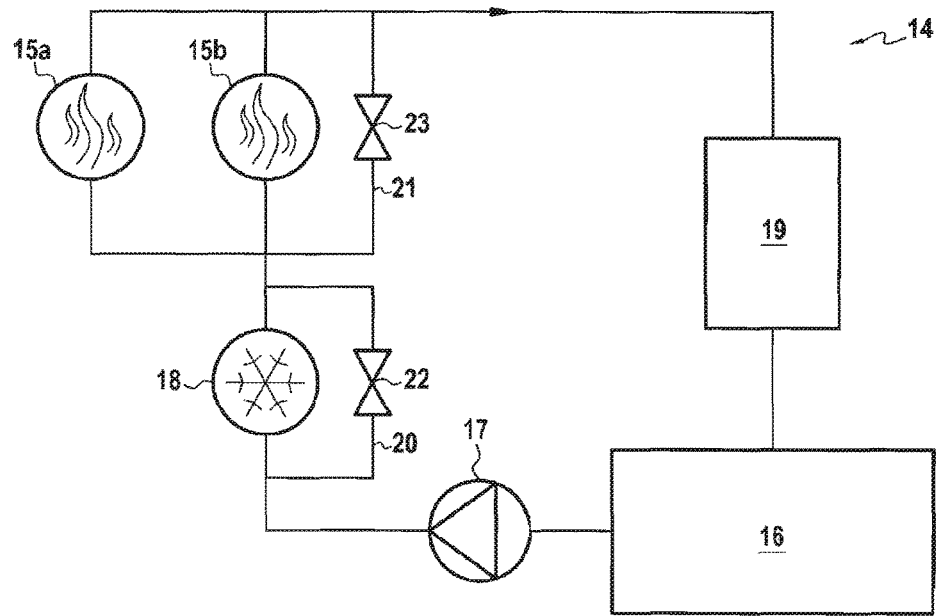
FIG. 13 is a diagram of the lubrication circuit in a fourth embodiment for one of the engines of the FIG. 2 power plant.
Figure 14:
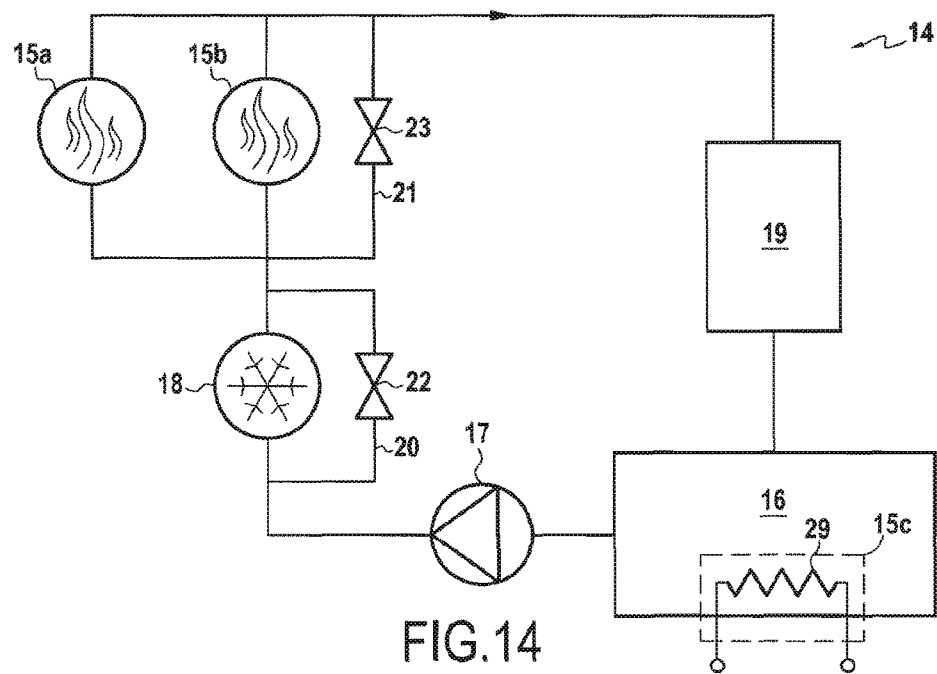
FIG. 14 is a diagram showing the lubrication circuit in a fifth embodiment for one of the engines the FIG. 2 power plant.

In general, it is always possible to envisage combining a plurality of heat sources that can be bypassed or deactivated in the lubrication circuit. Thus, in a fourth embodiment, shown in FIG. 13, two heat sources 15a and 15b are placed in parallel in the lubrication circuit 14. Each of these two heat sources 15a, 15b may correspond to any one of the variants shown in FIGS. 4A to 4H. The other elements are analogous to those of the first embodiment and they are given the same reference numbers. Thus, a common closable bypass duct 21 serves to bypass both heat sources 15a and 15b simultaneously, and the temperature of the lubricant may be regulated using the method of FIG. 5. In a fifth embodiment, shown in FIG. 14, the two heat sources 15a and 15b are combined with a third heat source 15c comprising an electrical resistor 29 in the tank 16, as in the second and third embodiments. The other elements are analogous to those of the fourth embodiment and they are given the same reference numbers. The temperature of the lubricant in this example can be regulated using the method of FIG. 9.

Figure 15:
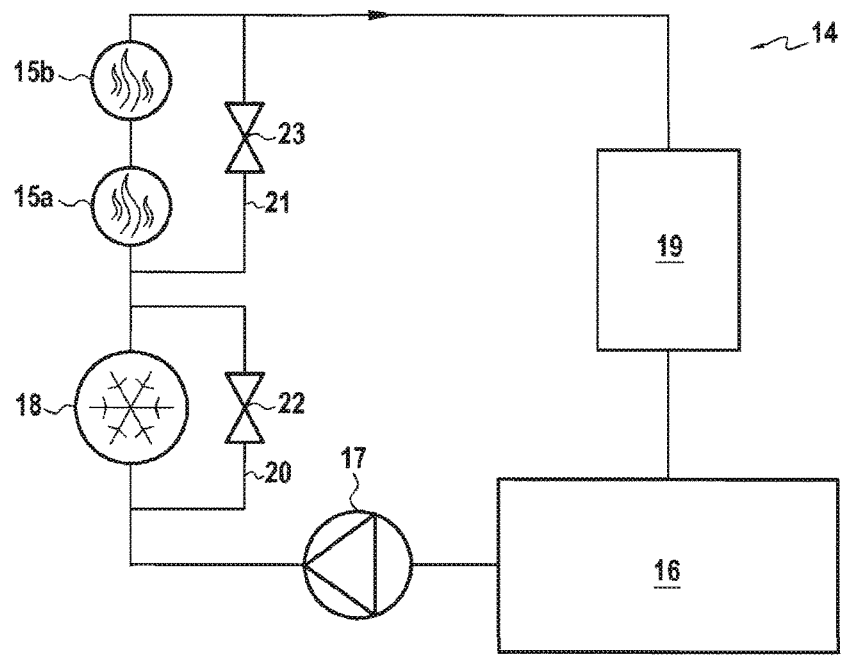
FIG. 15 is a diagram showing the lubrication circuit in a sixth embodiment for one of the engines of the FIG. 2 power plant.
Figure 16:
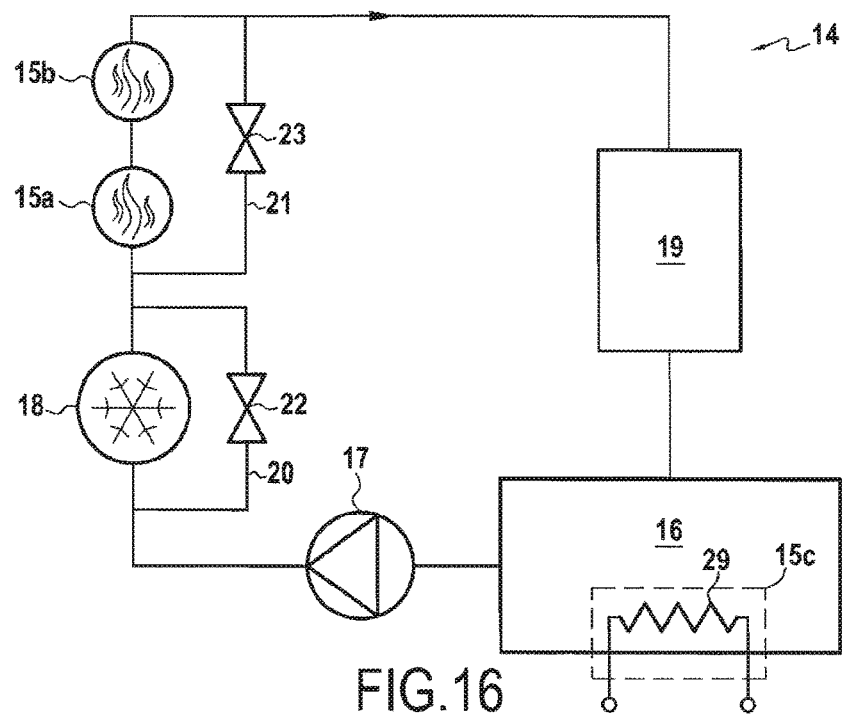
FIG. 16 is a diagram of the lubrication circuit in a seventh embodiment for one of the engines of the FIG. 2 power plant.

FIG. 15 shows a sixth embodiment, analogous to the fourth embodiment, but in which the two heat sources 15a and 15b are in series rather than in parallel. Elements analogous to those of the fourth embodiment are given the same reference numbers. FIG. 16 shows a seventh embodiment analogous to the fifth embodiment, but in which the two heat sources 15a and 15b are in series rather than in parallel. Elements analogous to those of the fourth embodiment are given the same reference numbers. In these last two embodiments, as in the fourth and fifth embodiments, the two heat sources 15a and 15b share a common closable bypass duct 21, thus enabling the temperature of the lubricant to be regulated using the method of FIG. 5 for the sixth embodiment and the method of FIG. 9 for the seventh embodiment. It is nevertheless equally possible to envisage fitting these lubrication circuits with individual closable bypass ducts for each of the first and second heat sources, with opening and closure thresholds that are equal or different for the closure devices in each of the individual bypass ducts.

Although the present invention is described with reference to specific embodiments, it is clear that various modifications and changes may be made to those embodiments without going beyond the general ambit of the invention as defined by the claims. For example, the optional electrical power supply to elements in each lubrication circuit could come from sources other than an electricity network of an aircraft, such as for example a dedicated generator and/or battery. In addition, individual characteristics of the various embodiments described may be combined in additional embodiments. Consequently, the description and the drawings should be considered in a sense that is illustrative rather than restrictive.

The invention claimed is:

1. A turbine engine comprising at least: a compressor;
a combustion chamber situated downstream from the compressor for combustion of a mixture of fuel and of air coming from the compressor;
a first turbine for expanding the combustion gas coming from the combustion chamber and driving the compressor via a first rotary shaft;
an actuator device for actuating said first rotary shaft to keep the first turbine and the compressor in rotation while the combustion chamber is extinguished; and
a lubrication circuit for lubricating the engine;
the lubrication circuit being arranged in such a manner as to lubricate at least one bearing of said first rotary shaft and passing through at least two heat sources including at least one electrical load suitable for converting electrical energy at least in part into heat for heating a lubricant in said lubrication circuit when the temperature of the lubricant drops below a first predetermined threshold while the first turbine and the compressor are rotating with the combustion chamber extinguished, wherein said at least two heat sources are arranged in parallel in said lubrication circuit.

2. The turbine engine according to claim 1, wherein said at least two heat sources comprises said actuator device.

3. The turbine engine according to claim or claim 2, wherein said at least two heat sources includes a heat exchanger for transmitting heat to the lubricant in the lubrication circuit.

4. The turbine engine according to claim 1, wherein said at least two heat sources comprises an electrical resistor.

5. The turbine engine according to claim 1, wherein said lubrication circuit includes a closable bypass duct around the at least two heat sources.

6. The turbine engine according to claim 1, wherein said lubrication circuit also passes through at least one heat sink for cooling said lubricant when the combustion chamber is lighted.

7. The turbine engine according to claim 1, wherein said actuator device comprises an electrical machine mechanically coupled to said first rotary shaft.

8. The turbine engine according to claim 7, wherein said actuator device further comprises a power converter for electrically powering said electrical machine.

9. The turbine engine according to claim 1, further comprising a second turbine arranged downstream from the first turbine and mechanically connected to a power takeoff shaft.

10. A power plant comprising:
a first turbine engine comprising:
a compressor;
a combustion chamber situated downstream from the compressor for combustion of a mixture of fuel and of air coming from the compressor;
a first turbine for expanding the combustion gas coming from the combustion chamber and driving the compressor via a first rotary shaft;
an actuator device for actuating said first rotary shaft to keep the first turbine and the compressor in rotation while the combustion chamber is extinguished; and
a lubrication circuit for lubricating the engine: the lubrication circuit being arranged in such a manner as to lubricate at least one bearing of said first rotary shaft and passing through at least two heat sources including at least one electrical load suitable for converting electrical energy at least in part into heat for heating a lubricant in said lubrication circuit when the temperature of the lubricant drops below a first predetermined threshold while the first turbine and the compressor are rotating with the combustion chamber extinguished, wherein said at least two heat sources are arranged in parallel in said lubrication circuit, and
a second turbine engine.

11. A method of regulating the temperature of a lubricant in a lubrication circuit of a turbine engine comprising at least:
a compressor;
a combustion chamber situated downstream from the compressor for combustion of a mixture of fuel and of air coming from the compressor;
a first turbine for expanding combustion gas coming from the combustion chamber and driving the compressor via a first rotary shaft; and
an actuator device for actuating said first rotary shaft;
wherein said lubricant for lubricating at least one bearing of said first rotary shaft is directed through at least two heat sources through which said lubrication circuit passes and comprising at least one electrical load for converting electrical energy at least in part into heat for heating the lubricant when the temperature of the lubricant drops below a first predetermined threshold while the first turbine and the compressor are being kept in rotation by said actuator device with the combustion chamber extinguished, wherein said at least two heat sources are arranged in parallel in said lubrication circuit.

12. The temperature regulation method according to claim 11, wherein said lubricant is directed through a heat sink through which said lubrication circuit passes in order to cool it when the temperature of the lubricant exceeds a second predetermined threshold while the combustion chamber is lighted.

* * * * *